United States Patent [19]

Seymour et al.

[11] Patent Number: 4,505,150
[45] Date of Patent: Mar. 19, 1985

[54] SENSING SURGES IN GAS TURBINE ENGINES

[75] Inventors: Stephen R. Seymour; Robert K. Guy, both of Bristol; Paul N. Roberts, Weston-Super-Mare, all of England

[73] Assignee: Rolls-Royce Limited, London, England

[21] Appl. No.: 448,486

[22] Filed: Dec. 10, 1982

[30] Foreign Application Priority Data

Dec. 30, 1981 [GB] United Kingdom ............... 8139035

[51] Int. Cl.³ .......................... G01J 5/34; D02B 3/00
[52] U.S. Cl. ..................................... 73/116; 374/144
[58] Field of Search ................ 73/116, 117.3; 374/144

[56] References Cited

U.S. PATENT DOCUMENTS

| 3,426,322 | 10/1965 | Balo | 73/116 X |
| 3,696,678 | 10/1972 | Mossey | |
| 3,855,864 | 12/1974 | Douglas | 374/144 X |
| 3,938,479 | 2/1976 | Oberstadt | 73/116 X |

FOREIGN PATENT DOCUMENTS

| 2419149 | 11/1975 | Fed. Rep. of Germany | 374/144 |
| 1089757 | 11/1967 | United Kingdom. | |
| 1237546 | 6/1971 | United Kingdom. | |
| 1503041 | 3/1978 | United Kingdom. | |
| 2018981 | 10/1979 | United Kingdom. | |
| 1592773 | 7/1981 | United Kingdom. | |

Primary Examiner—John W. Caldwell, Sr.
Assistant Examiner—Ellwood G. Harding, Jr.
Attorney, Agent, or Firm—Parkhurst & Oliff

[57] ABSTRACT

A pyrometer which senses blade temperature in the engine as also used to detect the onset of an engine surge. The output of the pyrometer 2 (FIG. 1) passes to a level detector unit, comprising a differential amplifier and a constant reference voltage, and which produces an output when the pyrometer signal exceeds the reference voltage. A duration detector comprising a monostable 12, inverter 14, delay line 18 and AND gate 16 determines the duration of the excess level signal and if the duration exceeds a given time, set by the monostable, an output from the duration detector actuates a fuel chopper to minimize the effect of the surge.

14 Claims, 2 Drawing Figures

SENSING SURGES IN GAS TURBINE ENGINES

This invention relates to the sensing of surges in gas turbine engines.

In a gas turbine engine a surge occurs if there is a breakdown of airflow through the engine compressor. When this occurs, too little air enters the engine combustors sufficiently to weaken the burning fuel mixture and unless the fuel supply is reduced an explosion may occur. Hence it is necessary to be able to detect a surge quickly to enable the fuel supply to be reduced.

A known method of detecting surges includes the use of pressure sensors in the compressor section (and possibly also other sections) of the engine to sense pressure increases which are indicative of surges.

It is known that in a surge condition the temperature of the gases leaving the engine combustors is increased and so causes the temperature of the engine turbine to increase extremely rapidly. However, heretofore it has not been considered practical to use the temperature of the turbine, as measured by a pyrometer, to sense the occurrence of a surge because the pyrometer signal in practice contains random high-level spikes caused by hot, uncombusted particles from the combustor and the measures taken to derive the true underlying signal are not fast enough to enable a surge to be sensed sufficiently quickly.

The present invention is based on the discovery by the inventor that it is possible to distinguish sufficiently quickly between spikes in a pyrometer output signal due to hot, uncombusted particles and increases in the output signal indicative of a surge.

According to the present invention a circuit for sensing, from a pyrometer output signal representative of the temperature of a turbine of a gas turbine engine, a surge in the engine comprises level detector means for receiving the pyrometer output signal and producing an output signal when the pyrometer output signal exceeds a predetermined level; and duration detector means for receiving the level detector means output signal and producing an output signal when the level detector means output signal has lasted for more than a predetermined duration, the predetermined level and the predetermined duration being so arranged that the duration detector means output signal is unresponsive to spurious high levels in the pyrometer output signal and is indicative of a surge in the engine.

One circuit for sensing a surge in a gas turbine engine from a pyrometer output signal representative of the temperature of the engine turbine will now be described, by way of example only, with reference to the accompanying drawings, in which.

Figure 1:
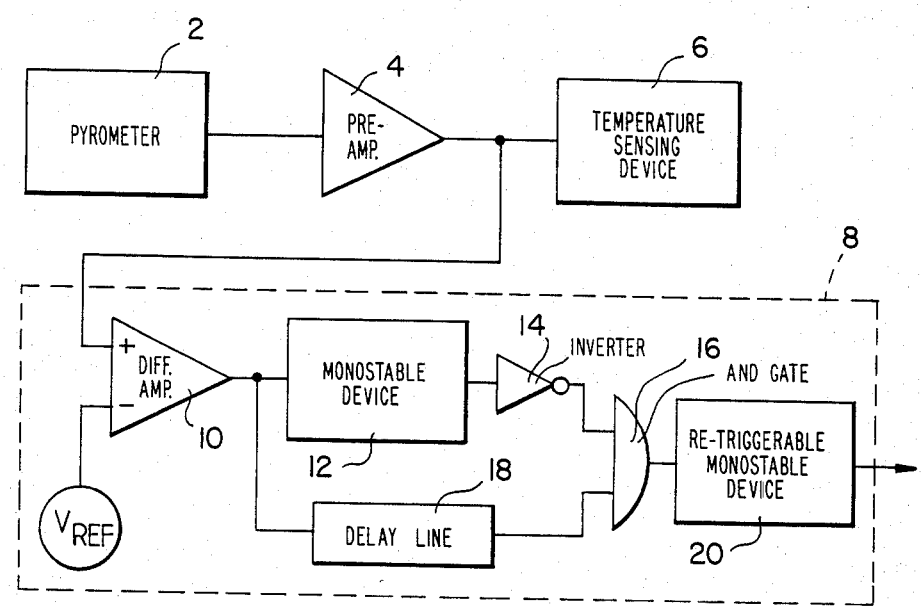
FIG. 1 shows a block schematic diagram of the circuit.

Referring firstly to FIG. 1, a pyrometer 2 of known type produces an electrical output signal representative of the temperature of the high-pressure turbine of a gas turbine engine (not shown). The pyrometer output signal, which may be pre-amplified in a pre-amplifier 4, is passed to temperature sensing circuitry 6 for use in normal engine control. The pyrometer output signal is also passed to a surge sensing circuit 8.

The surge sensing circuit 8 comprises a differential amplifier 10 of which the positive input is connected to receive the pyrometer output signal. The negative input of the differential amplifier 10 is connected to a source of constant, reference voltage $V_{REF}$.

The output of the differential amplifier 10 is connected to the input of a monostable device 12 whose output is connected through an inverter 14 to one input of a two-input AND gate 16. The output of the differential amplifier 10 is also connected through a delay line 18 to the other input of the AND gate 16. The output of the AND gate 16 is connected to the input of a re-triggerable monostable device 20 whose output forms the output of the sensing circuit 8.

Figure 2:
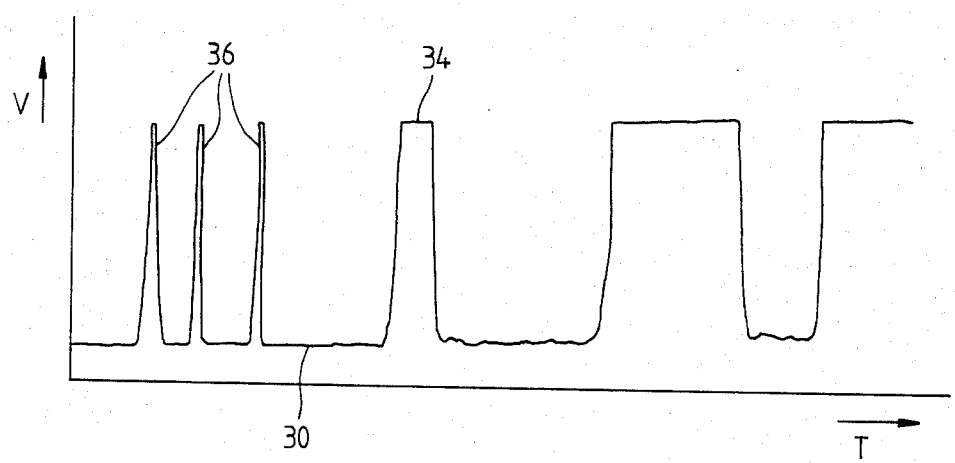
FIG. 2 shows a typical form of pyrometer output signal.

Referring now also to FIG. 2, the operation of the surge sensing circuit 8, is based upon the discovery that in the event of a surge in a gas turbine engine the pyrometer output signal 30 representative of turbine temperature has a very distinctive shape. The signal first increases (as shown at 34) to a level which saturates pre-amplifier 4 and maintains this level for a duration of typically six milliseconds. This "pulse" is followed by a period of apparently normal signal level and then relatively long periods of high signal level which again saturate the pre-amplifier 4. The surge sensing circuit 8 distinguishes between the first "pulse" (shown at 34) and the spurious spikes (shown at 36) due to hot, uncombusted particles from the engine combustion chamber passing the pyrometer sensor by using the fact that the duration of the "pulse" 34 has been found to be at least three times longer than the longest spike 36.

Referring again to FIG. 1, the surge sensing circuit 8 operates as follows. Each time that the pyrometer output signal from pre-amplifier 4 exceeds the reference voltage $V_{REF}$ (which in this example is set at 10 V) the differential amplifier 10 switches into positive saturation. The leading edge of this positive output from the differential amplifier 10 triggers the monostable device 12 to produce at its output a positive pulse of fixed duration (in this example 4 milliseconds). The inverter 14 thus causes a positive voltage normally to be applied to the AND gate 16 but this falls to zero while the monostable device 12 prodcues its output pulse. This positive output from the differential amplifier 10 is also applied to the other input of the AND gate 16 after a small delay in the delay line 18, the purpose of which will be described below.

Thus, the differential amplifier 10 and the reference voltage source act as a level detector, the differential amplifier 10 producing a positive output when the pyrometer output signal exceeds the level of the reference voltage $V_{REF}$. Also, the monostable device 12, inverter 14, delay line 18 and AND gate 16 act as a duration detector, the AND gate producing a positive output if the positive output from the differential amplifier 10 lasts for more than the time constant of the monostable device 12. It will be appreciated that a small delay must be introduced in the path from the differential amplifier 10 to the AND gate 16 since otherwise when the output of the differential amplifier 10 is switched to positive saturation this positive output would be immediately applied to the AND gate 16, causing the AND gate to produce a false positive output for the small but finite time which the monostable device 12 takes to trigger. Thus the delay required in the delay line 18 is just greater than the response time of the monostable device 12.

Thus the output of the AND gate 16 switches to a positive level each time the pyrometer output signal exceeds 10 V for a time greater than 4 milliseconds. It will be appreciated that since 4 milliseconds is greater than the duration of spurious spikes in the pyrometer output signal, but less than the duration of the first pulse in the event of a surge, a positive output from the AND gate 16 is indicative of a surge in the engine.

The positive output from the AND gate 16 is used to trigger a retriggerable monostable device 20 (which in this example has a time constant of 40 milliseconds) whose output is passed to the engine control unit (not shown) to reduce fuel flow to the engine. If further indications of surging are produced during the time when the retriggerable monostable device 20 is already producing its output, the monostable device will retrigger so as to re-commence its timing period and so continue to reduce the effect of engine surging.

It will be appreciated that the above described circuit enables a surge in the engine to be sensed simply and extremely quickly (e.g. in approximately 4 milliseconds) while obviating the use of pressure sensors within the engine.

We claim:

1. A circuit for sensing, from a pyrometer output signal representative of the temperature of a turbine of a gas turbine engine, a surge in the engine, the circuit comprising:

level detector means for receiving the pyrometer output signal and producing an output signal when the pyrometer output signal exceeds a predetermined level; and duration detector means for receiving the level detector means output signal and producing an output signal when the level detector means output signal has lasted for more than a predetermined duration, the predetermined level and the predetermined duration being so arranged that the duration detector means output signal is unresponsive to spurious pulses in the pyrometer output signal, but is responsive to an initial pulse characteristic of a surge in the engine.

2. A circuit according to claim 1 wherein the level detector means comprises a differential amplifier to one input of which the pyrometer output is connected and to the other input of which a source of a signal of the predetermined level is connected, the differential amplifier being arranged to switch into saturation when the pyrometer output signal exceeds the predetermined level.

3. A circuit according to claim 1 wherein the duration detector means comprises: a monostable device having a time constant equal to the predetermined duration and having its input connected to the output of the level detector means; an inverter having its input connected to the output of the monostable device; a two-input AND gate having one input connected to the output of the inverter and having the other input connected to the output of the level detector means.

4. A circuit according to claim 3 wherein the duration detector means further comprises delay means connected between the output of the level detector means and said other input of the AND gate.

5. A circuit according to claim 1 further comprising a retriggerable monostable device having its input connected to the output of the duration detector means.

6. A circuit according to claim 2 wherein the duration detector means comprises: a monostable device having a time constant equal to the predetermined duration and having its input connected to the output of the level detector means; an inverter having its input connected to the output of the monostable device; a two-input AND gate having one input connected to the output of the inverter and having the other input connected to the output of the level detector means.

7. A circuit according to claim 6 wherein the duration detector means further comprises delay means connected between the output of the level detector means and said input of the AND gate.

8. A circuit according to claim 2 further comprising a retriggerable monostable device having its input connected to the output of the duration detector means.

9. A circuit according to claim 3 further comprising a retriggerable monostable device having its input connected to the output of the duration detector means.

10. A circuit according to claim 4 further comprising a retriggerable monostable device having its input connected to the output of the duration detector means.

11. A circuit according to claim 6 further comprising a retriggerable monostable device having its input connected to the output of the duration means.

12. A circuit according to claim 7 further comprising a retriggerable monostable device having its input connected to the output of the duration detector means.

13. A circuit according to claim 1, wherein said predetermined duration is a period longer than a duration characteristic of said spurious pulses and shorter than the duration of said initial pulse.

14. A method for detecting a surge condition in a gas turbine engine comprising:

generating a signal indicative of the temperature of the turbine of the engine; and processing said signal to determine when it indicates a turbine temperature above a predetermined temperature for longer than a predetermined duration, in which the predetermined duration is longer than a duration characteristic of a spurious increase in said signal, but shorter than a duration characteristic of an initial pulse in said signal characteristic of a surge.

* * * * *